United States Patent
Cavallaro Corti et al.

(10) Patent No.: US 12,238,130 B2
(45) Date of Patent: Feb. 25, 2025

(54) METHOD FOR DETECTING ANOMALIES IN DATA TRAFFIC GENERATED BY PERIPHERAL DEVICES SIMULATING HUMAN-LIKE PATTERNS

(71) Applicant: Nozomi Networks Sagl, Mendrisio (CH)

(72) Inventors: Alessandro Cavallaro Corti, Varese (IT); Luca Cremona, Venegono Inferiore (IT); Alessandro Di Pinto, Malnate (IT); Alessandro Valente, Castelfranco Veneto (IT); Alessandro Zamberletti, Luxembourg (LU)

(73) Assignee: Nozomi Networks Sagl, Mendrisio (CH)

( * ) Notice: Subject to any disclaimer, the term of this patent is extended or adjusted under 35 U.S.C. 154(b) by 233 days.

(21) Appl. No.: 18/058,985

(22) Filed: Nov. 28, 2022

(65) Prior Publication Data
US 2024/0179163 A1    May 30, 2024

(51) Int. Cl.
*H04L 9/40* (2022.01)
*G06N 3/02* (2006.01)
*H04L 41/14* (2022.01)
*H04L 41/16* (2022.01)

(52) U.S. Cl.
CPC ............ *H04L 63/1425* (2013.01); *G06N 3/02* (2013.01); *H04L 41/145* (2013.01); *H04L 41/16* (2013.01)

(58) Field of Classification Search
CPC .............. H04L 63/1425; H04L 63/145; H04L 63/1416; H04L 41/145; H04L 41/16; H04L 9/40; G06N 3/02; G06N 3/08; G06F 21/55; G06F 21/552; G06F 21/316
See application file for complete search history.

(56) References Cited

U.S. PATENT DOCUMENTS

| 2020/0356665 | A1* | 11/2020 | Denney | G06N 7/01 |
| 2022/0092478 | A1* | 3/2022 | Mishra | G06N 7/01 |
| 2023/0046532 | A1* | 2/2023 | Saberidokht | G06F 9/544 |

* cited by examiner

*Primary Examiner* — Sangseok Park
(74) *Attorney, Agent, or Firm* — Jason Lee DeFrancesco

(57) ABSTRACT

The present invention relates to a method for detecting anomalies in data traffic generated by peripheral devices simulating human-like patterns retrieving all data packets sent by a peripheral device to a computer, identifying a data communication as a plurality of the data packets in a predetermined timeframe, parsing the content of each of the data packets of the data communication to extract a plurality of communication features of the data communication, classifying the communication features through a set of absolute classifiers and through a set of majority classifiers and signalling an anomaly of the data communication when at least the majority in the set of absolute classifiers or at least one in the set of absolute classifiers define the data communication as malicious.

11 Claims, No Drawings

METHOD FOR DETECTING ANOMALIES IN DATA TRAFFIC GENERATED BY PERIPHERAL DEVICES SIMULATING HUMAN-LIKE PATTERNS

FIELD OF INVENTION

The present invention relates to the field of security management of infrastructures, such as automation systems and industrial production systems. In particular, the present invention relates to a method for detecting anomalies in data traffic generated by peripheral devices.

BACKGROUND ART

Security products of known type detect malicious attacks and sometimes are also able to take action to prevent them. The majority of intrusion prevention systems, or Intrusion Detection System (IDS), utilize one of detection methods between signature-based, statistical anomaly-based, and stateful protocol analysis. Signature-based IDS monitors packets in the Network and compares with pre-configured and pre-determined attack patterns known as signatures. An IDS which is anomaly-based will monitor network traffic and compare it against an established baseline. The baseline will identify what is normal for that network. Finally, the stateful protocol analysis detection identifies deviations of protocol states by comparing observed events with pre-determined profiles of generally accepted definitions of benign activity.

Detecting anomalous behaviours in a network of computers is a complex but fundamental task for an IDS. With regards to Operational Technology (OT) networks, useful anomalies to be detected are when a device starts a communication with an unexpected protocol, which can be a symptom that the device under monitoring has been contacted by a malicious node inside the network that is performing a network scan or maybe just a configuration error. Moreover, useful anomalies to be detected are when a new function code is used inside a communication with a legit protocol. In this regard, a function code is an operation that an OT device supports, wherein common operations are "read variable", "write variable", "start device", "stop device" or "update firmware". Some of these operations can be disruptive for the device itself and as a consequence for the process that the device serves. An unexpected function code sent to a device can be a symptom of an attacker trying to disrupt the device, a reconnaissance attempt or a misconfiguration.

Moreover, cybersecurity risks related to the use of peripheral devices are on the rise, in particular with external peripheral devices. Rogue peripheral devices may be manufactured to look and feel like regular ones, yet incorporate extra functions that are kept hidden to users and exploited by hackers. By these means, attackers may leverage the common tendency to pick and connect peripheral devices casually, unaware of the potential security implications. Such kind of attacks often target users less conscious of cyber risks, de facto leveraging the so-called "layer 8" (user layer) of the OSI model.

The attack landscape associated with rogue peripheral devices is broad. For instance, it is possible to categorize keystroke injection, malware delivery, data exfiltration, network traffic hijack, electrical damage, and data alteration. Taking into account peripheral devices of the USB type, popular examples of USB-based cyber-attacks include:

"Rubber Ducky" attack, wherein the peripheral device acts as a keyboard emulator, sending commands to the host computer in the form of keystrokes;

"BashBunny" attack, wherein the device is a USB-powered small computer, able to simulate a keyboard or a mouse, a mass storage device, or a USB network card.

In terms of protection against USB attacks, or in general against attack from peripheral devices, the strategies adopted in the business are often preventive in nature. Examples include avoiding untrusted providers or restricting use to well-known/whitelisted devices.

Moreover, detective technologies have been deployed which are able to sniff the peripheral devices traffic, i.e. USB traffic, to evaluate it against rules and take countermeasures as needed.

Data science methods can play a fundamental role in this direction. For instance, time series analysis of keystrokes can help to rule out typing patterns or speeds that are unfeasible for a human operator or a given keyboard layout. However, effective anomaly detection can depend on several individual features in complex ways.

Simple threshold-based detection rules can be bypassed easily by attackers via software. Even open projects available to the state-of-the-art show how artificial keystroke injection can be disguised through the introduction of random delays.

Moreover, it has to be noted that individual features may produce indicators with very diverse degrees of reliability and some meaningful indicators may only emerge from the combination of individual features.

The challenge with peripheral devices traffic resides therefore in a fast, reliable, and scalable recognition of even complex attacks.

It would therefore be desirable to have a method capable of detecting anomalies with the ability to identify abnormal behavior of peripheral devices in a real-time mode by making use of traffic sniffed from said peripheral devices.

BRIEF DESCRIPTION OF THE INVENTION

The object of the present invention is to provide a method for detecting rogue peripheral devices. In particular, it would be desirable to provide a method for detecting anomalies behaviors of peripheral devices in a computer or in a network, able to recognize any malicious activity in a dynamic, reliable and fast way.

According to the present invention is described, therefore, a method for detecting anomalies in data traffic generated by peripheral devices simulating human-like patterns.

The method comprises:

retrieving, by computerized data processing means, all data packets sent by a peripheral device to a computer;

identifying, by the computerized data processing means, a data communication as a plurality of the data packets in a predetermined timeframe;

parsing, by the computerized data processing means, the content of each of the data packets of the data communication to extract a plurality of communication features of the data communication;

classifying, by the computerized data processing means, the communication features through a set of absolute classifiers of the binary type comprising two or more absolute classifiers and through a set of majority classifiers of the binary type comprising an odd number of majority classifiers; and signalling, by the computerized data processing means, an anomaly of the data communication when at least the majority in the set of majority classifiers or at least one in the set of absolute classifiers marks the communication features as anomalous.

In a further embodiment, the communication features comprise words or key combinations, and wherein the set of absolute classifiers comprises a deny list classifier which marks the data communication as anomalous if the communication features are comprised in a predetermined list of anomalous words or key combinations.

In a further embodiment, the communication features comprise words provided with timestamps, and wherein the set of absolute classifiers comprises a neural network classifier which marks the data communication as anomalous if a neural network using as input features the communication features generates an output vote greater than a predetermined output vote.

In a further embodiment, the communication features comprise key release speed features as the time interval between the typing of a key and its release, and wherein the set of absolute classifiers comprises a key release speed classifier which marks the data communication as anomalous if the communication features are below a predetermined releasing-speed threshold.

In a further embodiment, the communication features comprise key code features as bytes code of the typed keys, and wherein the set of absolute classifiers comprises an inconsistent code classifier which marks the data communication as anomalous if the communication features are inconsistent with respect to a predetermined keyboard layout.

In a further embodiment, the communication features comprise key typing speed features as the time interval between the typing of keys or words, and wherein the set of majority classifiers comprises a typing speed classifier which marks the data communication as anomalous if the communication features are below a predetermined typing speed threshold.

In a further embodiment, the communication features comprise keys transition speed features as the time interval between the typing of key pairs, and wherein the set of majority classifiers comprises a transition matrix classifier which marks the data communication as anomalous if the communication features are lower than a predetermined typing speed pairs threshold.

In a further embodiment, the communication features comprise typing speed distribution features as the distribution of the typing speeds across single or multiple words, and wherein the set of majority classifiers comprises a typing speed distribution classifier which marks the data communication as anomalous if the communication features are different from a predetermined typing speed distribution.

In a further embodiment, the data communication comprises a plurality of the data packets able to define a word in the predetermined timeframe.

In a further embodiment, the data communication comprises a plurality of the data packets able to define a group of words in the predetermined timeframe.

DETAILED DESCRIPTION OF THE INVENTION

The present invention relates to a method for detecting anomalies in data traffic generated by peripheral devices simulating human-like patterns which are connected to a computer or to an infrastructure in a network.

The method according to the present invention finds a useful application in any kind of computer or network of computers. Moreover, it finds useful application with all the technology environments, including Information Technology (IT), Operation Technology (OT) and Internet of Things (IoT).

The description that follows will made reference to a USB keyboard as peripheral device, but the present invention could find useful application with any kind of peripheral device which can simulate human-like patterns, without limitation to the kind of connection used to communicate with a computer, such as wireless keyboards, wireless pointing devices or wireless peripherals able to simulate a keyboard or a pointing device.

The object of the present invention is to provide a method for detecting anomalies in real-time mode. In particular, the object of the present invention is to provide a method for detecting anomalies of data patterns exchanged between a peripheral device and a computer to which it is connected in a dynamic way.

In this regard, the method according to the present invention is based on classifiers, also based on Machine Learning methodologies, and their results aggregation.

The term "classifier" relates, in the present invention, to an entity that, given a particular observable O composed of a set of features O={f1, f2, f3} as input, associates this observable to one or more categories taken from a group of all the possible categories. For example, a classifier can be an algorithm that given the photo of an animal recognizes every photo depicting that particular animal. A binary classifier relates to a classifier which has only two mutually exclusive categories to choose from. A classifier ensemble relates to a group of classifiers where each classifier votes for which categories an observable belongs.

The starting point of the method according to the present invention is the retrieving, by computerized data processing means, of all data packets sent by a peripheral device to a computer. In the preferred embodiment, the data packets are taken from the USB traffic generated by the USB keyboard towards the computer to which it is connected.

The method further comprises identifying (i.e., by sniffing), by the computerized data processing means, a data communication as a plurality of the data packets in a predetermined timeframe. When listening to the traffic produced by an USB device it is necessary to wait for non-empty data packets.

Therefore, a parsing is done, by the computerized data processing means, through which the content of each of the data packets of the data communication to extract a plurality of communication features of the data communication. Whenever a new data packet is received, the data packet is analyzed, its content is parsed and eventually stored in a volatile or non-volatile storage medium.

When enough data packets are analyzed, the traffic analysis is triggered, as will be described in greater details in the following. Many different criteria can be used to decide when enough data packets have been analyzed as herewith detailed.

In a preferred embodiment, the data communication comprises a plurality of said data packets able to define a word in the predetermined timeframe. That is, the timeframe is not fixed but determined by the reconstruction of a word by the plurality of data packets analysed. This word-based analysis is done by reconstructing the typed words from USB data packets. This approach allows not only to analyze features like the typing speed, but also to perform a semantic analysis of what is being written. Moreover, the data packets can be considered in a moving fashion timeframe, i.e. considering a data packet in a shifting timeframe.

To optimize the efficiency of this strategy, the best choice for when to analyze the stored packets is whenever a key commonly used to separate words is pressed. As an example, it is possible to use the following groups of keys as indicators for the end of a particular word:

Separator keys: such as Enter, Tab, Spacebar and punctuation keys;
Vertical navigation keys: such as Up and Down arrows, Page up, Page down and End;
Function keys: such as F1, F2, F3, etc.;
Other special keys: such as Num Lock, Clear, Home, Insert, Escape, Print Screen, Pause.

In a further embodiment, the data communication comprises a plurality of the data packets able to define a group of words in the predetermined timeframe. That is, the timeframe is not fixed but determined by the reconstruction of a group of words in a predetermined number by the plurality of data packets analysed. In this regard, the predetermined number of words could be preferably equal to three, but a greater number of words can be grouped. Moreover, the data packets can be considered in a moving fashion timeframe, i.e. considering a data packet in a shifting timeframe.

As stated above, having multiple data packets allows to perform more complex analysis and therefore to extrapolate more information than just the typing speed. In this regard, in the present invention the communication features bringing the highest information are herewith defined in a non-limiting description, that is more and/or different communication features can be also taken into consideration.

Communication features considered in the present embodiment are, therefore, "key release speed features", namely the time interval between the typing of a key and its release, "words, key combination and shortcuts features", "words provided with timestamps", "key typing speed features" as the time interval between the typing of keys (keystrokes) or words, "keys transition speed features" as the time interval between the typing of specific key pairs, "typing speed distribution features" as the distribution of the typing speeds across single or multiple words. Moreover, "key code features" as bytes code of the typed keys, wherein consistency between key codes and keyboard layout is considered, namely if the bytes code of the pressed keys is consistent with what we would expect from that device. E.g., if from an US layout keyboard, are received key codes of a Japanese keyboard this would be signaled as an inconsistency.

Subsequent to the definition of the data communication, the method according to the present invention comprises classifying, by the computerized data processing means, the communication features through a set of absolute classifiers of the binary type comprising two or more absolute classifiers and through a set of majority classifiers of the binary type comprising an odd number of majority classifiers. Therefore, the communication features extracted are derived from the analyzed data packets and then sent to a classification system whose goal is to distinguish between patterns, i.e. USB traffic, generated by a normal human working on a machine or by a malicious traffic injection.

The classification system implemented in the present invention is an ensemble of binary classifiers. As stated above, each classifier in this ensemble, given the extracted communication features, either votes for "normal pattern" (human) or "anomalous pattern" (malicious).

The final choice is computed using a specifically designed voting system. In particular, the method according to the present invention comprises signalling, by the computerized data processing means, an anomaly of the data communication when at least the majority of the set of majority classifiers and at least one of the set of absolute classifiers marks the communication features as anomalous.

In a first example, consider a so-called "simple attack". An attack of this type is performed by injecting traffic, i.e. data packets, at the highest possible speed. The advantage of this type of attack is that it is almost immediate and therefore very hard to notice for the user. However, this type of attack can be easily detected using a "naïve" detection method which analyzes the key typing speed features extrapolated from the USB traffic (or from any kind of traffic in general) of a particular device. To detect this class of attacks, it is possible to compute the mean of the key typing speed features for a certain number of data packets and raise an alert whenever it goes below a certain threshold. Average values of human-like typing speed range from 100 ms to 200 ms, therefore an example of a human-like threshold for the typing speed is a value between 50 to 80 ms; below such threshold the keystrokes can be marked as anomalous.

On the other hand, in case of more complex attacks, a detection method based on the key typing speed features is not enough to detect the malicious traffic injection. An example of complex attack might be a situation where a delay is introduced between the transmission of each data packet in order to simulate a human-like typing. In this regard, the following classifiers are herewith defined in a non-limiting description, that is more and/or different classifiers can be also taken into consideration.

Classifiers considered in the present embodiment are, therefore, "typing speed classifier", "translation matrix classifier", and "typing speed overall distribution classifier" as majority voters' classifier. Moreover, classifiers considered in the present invention are, therefore, "deny list classifier", "neural network classifier", "key release speed classifier" and "inconsistent code classifier" as absolute voters' classifier.

Taking into account the communication features which comprise words or key combinations, the set of absolute classifiers may comprise a deny list classifier which marks the data communication as anomalous if the communication features are comprised in a predetermined list of anomalous words or key combinations. Therefore, the deny list classifiers analyze the reconstructed words, commands and shortcuts parsed from the traffic or data packets. These words and commands are then compared to a list of prohibited or anomalous words, patterns and commands. If any of them belongs to this list, the traffic is considered anomalous.

Taking into account the communication features which comprise words provided with timestamps, the set of absolute classifiers may comprise a neural network classifier which marks the data communication as anomalous if a neural network using as input features the communication features generates an output vote greater than a predetermined output vote. Therefore, the Neural Network classifier uses an Artificial Neural Network to determine if the traffic is compatible with a human-like typing. The Network uses as input features the typed words alongside the timestamp at which each key is typed/released and produces a binary output value representing its vote. If the output is 0 the traffic is considered human-like, otherwise it is considered anomalous. The dataset used to train the Neural Network consists in both good traffic, generated from several persons typing, and some simulated attack scenarios.

Taking into account the communication features which comprise key release speed features, the set of absolute classifiers may comprise a key release speed classifier which marks the data communication as anomalous if the communication features are below a predetermined releasing-speed threshold. Therefore, the key release speed classifier checks the time between the typing of a key and its release. If that time interval is below the mechanical (or electronical) limit of a keyboard, the traffic is considered anomalous. Likewise to the key typing speed classifier, it is preferred to consider the mean key release speed of an entire word. This value is then checked against a threshold of 30 ms. When the observed value is lower than such threshold, the traffic is considered anomalous.

Taking into account the communication features which comprise key code features, the set of absolute classifiers may comprise an inconsistent code classifier which marks the data communication as anomalous if the communication features are inconsistent with respect to a predetermined keyboard layout. Therefore, the inconsistent codes classifier checks if the received USB packets contain inconsistent codes with the current layout. If this is the case, the traffic is then considered anomalous. E.g., if the current keyboard layout is the US one but the codes for Japanese or Brazilian characters are received the classifiers will mark the traffic as anomalous.

Taking into account the communication features which comprise key typing speed features, the set of absolute classifiers may comprise a typing speed classifier which marks the data communication as anomalous if the communication features are below a predetermined typing speed threshold. Therefore, the typing speed classifier considers the typing speed, defined as the time interval between consecutive keystrokes, at which a word is typed. If the typing speed of a word is below a human-like threshold the traffic is marked as anomalous. In the present invention, the use of the mean typing speed of an entire word, which is more consistent respect to the typing speed of a single keystroke, is preferred. The mean typing speed of an entire word is then confronted against an 80 ms threshold.

Taking into account the communication features which comprise keys transition speed features, the set of absolute classifiers may comprise a transition matrix classifier which marks the data communication as anomalous if the communication features are lower than a predetermined typing speed threshold specific for each key pair. Therefore, the transition matrix classifier checks the time interval between the typing of each key pair and confronts it with a human-like value depending on the keyboard layout. E.g. if the letter 'a' and 'b' are typed within a time interval that is not compatible with the average time interval of a human, given the keyboard layout, the traffic will be considered anomalous. In the present invention, to obtain the "human time interval values" a large amount of non-malicious traffic has been analyzed. From this traffic the average time interval for each key pair has been extrapolated alongside with its standard deviation. The time interval compatibility is then computed using the lambda index:

$$\lambda = \frac{|t - t_m|}{\sigma}$$

Where "t" is the time interval between a key pair, "$t_m$" the mean time interval for that key pair and "σ" its standard deviation. In the preferred embodiment, if the values of "λ" is greater than 2, the traffic is considered anomalous.

Taking into account the communication features which comprise typing speed distribution features, the set of absolute classifiers may comprise a typing speed distribution classifier which marks the data communication as anomalous if the communication features are different from a predetermined typing speed distribution. Therefore, the typing speed distribution classifier considers the overall distribution of the typing speed across one or multiple words and compares it to a human-like distribution. If the two distributions are incompatible the traffic is considered anomalous. The human-like distribution of the typing speed, similarly to the transition matrix for the previous classifiers, is obtained analyzing a large amount of non-malicious traffic. In the present invention, the Jensen-Shannon divergence is used as a measure of compatibility but further alternatives can be considered. In this regard, the threshold at which the traffic is considered anomalous is when the distance is greater than 0.5.

Finally, among the many possible options for the voting system, in the present invention a combined majority and absolute voting system is defined.

The classifiers are divided in two groups: the majority voters and the absolute voters. The features extracted from the data packet analysis are sent to each classifier and the votes of each group are collected. From the votes of each group a final decision is taken. In the case of the majority voters, as the name suggests, if the majority of the classifiers votes for the traffic to be anomalous then it will be marked as such. For the absolute voters on the other hand, a single classifier voting for the traffic to be anomalous is sufficient to mark it as such.

The final vote from the majority voters and the absolute voters are then once again combined using an absolute voting system, namely the pattern will be considered "normal" only if both the absolute voters and the majority voters classified it as such. This strategy is methodologically equivalent to considering the final vote of the majority group as one of the votes in the absolute voting group.

The rationale behind dividing the binary classifiers in these two groups is to separate classifiers with very different accuracy and behavior. More specifically, they have been grouped together, in the majority voting group, classifiers with a good overall detection of the many possible attack strategies but for which a false-positive or false-negative detection is not rare. The combination of many classifiers with this behavior in a voting system allows to significantly reduce the number of false-positives and false-negatives while increasing the detection power. On the other hand, the classifiers part of the absolute voting group must have a completely different behavior. Given the importance of their vote, the chance of them returning a false-positive must be very low. For this very reason, each one of the classifiers in this group focuses on one particular feature or attack strategy. This results in many false-negative detections from these classifiers for more general attacks (which are instead detected by the majority voters) but ensures a very precise detection of specific attacks (high precision and low recall).

The chosen hybrid voting strategy, namely a combination of majority and absolute voting, allows for very good overall detection results. In fact, thanks to the majority voting system, the method according to the present invention is capable of detecting generic and not particularly sophisticated attacks (e.g. fast traffic injection, etc.). Furthermore, thanks to the absolute voting system, it is also capable of detecting more specific and complex attacks (e.g. replayed human-like injections).

The invention therefore defines a detection pipeline able to detect traffic injection attacks from malicious peripheral devices and, in particular, from peripheral devices of the USB type.

The invention is able to identify a wide variety of attacks also of a complex type that can be performed with several different methodologies.

The invention claimed is:

1. A method for detecting anomalies in data traffic generated by peripheral devices simulating human-like patterns comprising:
retrieving, by computerized data processing means, all data packets sent by a peripheral device to a computer;
identifying, by said computerized data processing means, a data communication as a plurality of said data packets in a predetermined timeframe;
parsing, by said computerized data processing means, the content of each of said data packets of said data communication to extract a plurality of communication features of said data communication;
classifying, by said computerized data processing means, said communication features through a set of absolute classifiers of the binary type comprising two or more absolute classifiers and through a set of majority classifiers of the binary type comprising an odd number of majority classifiers; and
signalling, by said computerized data processing means, an anomaly of said data communication when at least the majority in said set of majority classifiers or at least one in said set of absolute classifiers marks said communication features as anomalous;
wherein said communication features comprise words or key combinations, and
wherein said set of absolute classifiers comprises a deny list classifier which marks said data communication as anomalous if said communication features are comprised in a predetermined list of anomalous words or key combinations.

2. The method for detecting anomalies in data traffic generated by peripheral devices simulating human-like patterns according to claim 1, wherein said communication features further comprise words provided with timestamps, and wherein said set of absolute classifiers further comprises a neural network classifier which marks said data communication as anomalous if a neural network using as input features said communication features generates an output vote greater than a predetermined output vote.

3. The method for detecting anomalies in data traffic generated by peripheral devices simulating human-like patterns according to claim 1, wherein said communication features further comprise key release speed features as the time interval between the typing of a key and its release, and wherein said set of absolute classifiers further comprises a key release speed classifier which marks said data communication as anomalous if said communication features are below a predetermined release speed threshold.

4. The method for detecting anomalies in data traffic generated by peripheral devices simulating human-like patterns according to claim 1, wherein said communication features further comprise key code features as bytes code of the typed keys, and wherein said set of absolute classifiers further comprises an inconsistent code classifier which marks said data communication as anomalous if said communication features are inconsistent with respect to a predetermined keyboard layout.

5. The method for detecting anomalies in data traffic generated by peripheral devices simulating human-like patterns according to claim 1, wherein said communication features further comprise key typing speed features as the time interval between the typing of keys or words, and wherein said set of majority classifiers further comprises a typing speed classifier which marks said data communication as anomalous if said communication features are below a predetermined typing speed threshold.

6. The method for detecting anomalies in data traffic generated by peripheral devices simulating human-like patterns according to claim 1, wherein said communication features further comprise keys transition speed features as the time interval between the typing of key pairs, and wherein said set of majority classifiers further comprises a transition matrix classifier which marks said data communication as anomalous if said communication features are lower than a predetermined typing speed pairs threshold.

7. The method for detecting anomalies in data traffic generated by peripheral devices simulating human-like patterns according to claim 1, wherein said communication features further comprise typing speed distribution features as the distribution of the typing speeds across single or multiple words, and wherein said set of majority classifiers further comprises a typing speed distribution classifier which marks said data communication as anomalous if said communication features are different from a predetermined typing speed distribution.

8. The method for detecting anomalies in data traffic generated by peripheral devices simulating human-like patterns according to claim 1, wherein said data communication comprises a plurality of said data packets able to define a word in said predetermined timeframe.

9. The method for detecting anomalies in data traffic generated by peripheral devices simulating human-like patterns according to claim 1, wherein said data communication comprises a plurality of said data packets able to define a group of words in said predetermined timeframe.

10. A method for detecting anomalies in data traffic generated by peripheral devices simulating human-like patterns comprising:
retrieving, by computerized data processing means, all data packets sent by a peripheral device to a computer;
identifying, by said computerized data processing means, a data communication as a plurality of said data packets in a predetermined timeframe;
parsing, by said computerized data processing means, the content of each of said data packets of said data communication to extract a plurality of communication features of said data communication;
classifying, by said computerized data processing means, said communication features through a set of absolute classifiers of the binary type comprising two or more absolute classifiers and through a set of majority classifiers of the binary type comprising an odd number of majority classifiers; and
signalling, by said computerized data processing means, an anomaly of said data communication when at least the majority in said set of majority classifiers or at least one in said set of absolute classifiers marks said communication features as anomalous;
wherein said communication features comprise words provided with timestamps; and,
wherein said set of absolute classifiers comprises a neural network classifier which marks said data communication as anomalous if a neural network using as input features said communication features generates an output vote greater than a predetermined output vote.

11. A method for detecting anomalies in data traffic generated by peripheral devices simulating human-like patterns comprising:
- retrieving, by computerized data processing means, all data packets sent by a peripheral device to a computer;
- identifying, by said computerized data processing means, a data communication as a plurality of said data packets in a predetermined timeframe;
- parsing, by said computerized data processing means, the content of each of said data packets of said data communication to extract a plurality of communication features of said data communication;
- classifying, by said computerized data processing means, said communication features through a set of absolute classifiers of the binary type comprising two or more absolute classifiers and through a set of majority classifiers of the binary type comprising an odd number of majority classifiers; and
- signalling, by said computerized data processing means, an anomaly of said data communication when at least the majority in said set of majority classifiers or at least one in said set of absolute classifiers marks said communication features as anomalous;
  - wherein said communication features comprise key code features as bytes code of the typed keys; and,
  - wherein said set of absolute classifiers comprises an inconsistent code classifier which marks said data communication as anomalous if said communication features are inconsistent with respect to a predetermined keyboard layout.

* * * * *